(12) United States Patent
Chambers

(10) Patent No.: US 6,945,177 B2
(45) Date of Patent: Sep. 20, 2005

(54) WORKBENCH AND UNLOADING PLATFORM PARTIALLY SUPPORTED BY VEHICLE HITCH

(76) Inventor: Walter E. Chambers, 1814 1st Ave. N., Denison, IA (US) 51442

( * ) Notice: Subject to any disclaimer, the term of this patent is extended or adjusted under 35 U.S.C. 154(b) by 298 days.

(21) Appl. No.: 10/417,077

(22) Filed: Apr. 17, 2003

(65) Prior Publication Data

US 2004/0206278 A1 Oct. 21, 2004

(51) Int. Cl.$^7$ .............................................. A47B 23/00
(52) U.S. Cl. ........................................................ 108/44
(58) Field of Search ........................ 108/44, 45, 51.11; 224/122, 400, 489, 512, 599, 519, 520, 524; 296/26.02, 24.32–26.03, 26.08, 26.12

(56) References Cited

U.S. PATENT DOCUMENTS

| | | | | |
|---|---|---|---|---|
| 2,811,111 A | * | 10/1957 | Levitz et al. | 296/24.32 |
| 4,055,206 A | * | 10/1977 | Griffin | 296/24.32 |
| 4,516,308 A | | 5/1985 | Urban | |
| 4,974,805 A | * | 12/1990 | Douglas | 108/44 |
| 4,993,088 A | * | 2/1991 | Chudik | 108/44 |
| 5,224,636 A | | 7/1993 | Bounds | |
| 5,267,748 A | | 12/1993 | Curran | |
| 5,899,518 A | * | 5/1999 | Schreiner | 296/26.01 |
| 5,921,614 A | * | 7/1999 | Biedermann et al. | 108/44 |
| 6,095,060 A | * | 8/2000 | Ma | 108/44 |
| 6,224,127 B1 | | 5/2001 | Hodge | |
| 6,250,702 B1 | * | 6/2001 | Eipper | 108/44 |
| 6,314,891 B1 | * | 11/2001 | Larson | 108/44 |
| 6,662,983 B2 | * | 12/2003 | Lane et al. | 108/44 |
| 6,824,183 B1 | * | 11/2004 | Hodge | 108/44 |

* cited by examiner

Primary Examiner—Jose V. Chen
(74) Attorney, Agent, or Firm—Richard C. Litman

(57) ABSTRACT

A combination workbench and unloading platform having a lower frame having a center bar supported by a vehicle hitch in front and a rear cross bar supported by two rear legs and being foldable by connecting its members with hinges and having sleeves with removable pins for erection. An upper rectangular frame is supported on the lower frame by risers. Upper frame side bars are offset below the level of front and rear cross bars and having slideable sleeves along each offset portion. Movable work support cross bars are supported for sliding and rotation on the offset portions allowing them to be moved to desired positions and angles or individually removed. The upper frame and support cross bars form a level support for a workpiece such as a plywood sheet and the support cross bars may be adjusted allowing sawing at desired angles while held by a gravity swivel clamp.

20 Claims, 10 Drawing Sheets

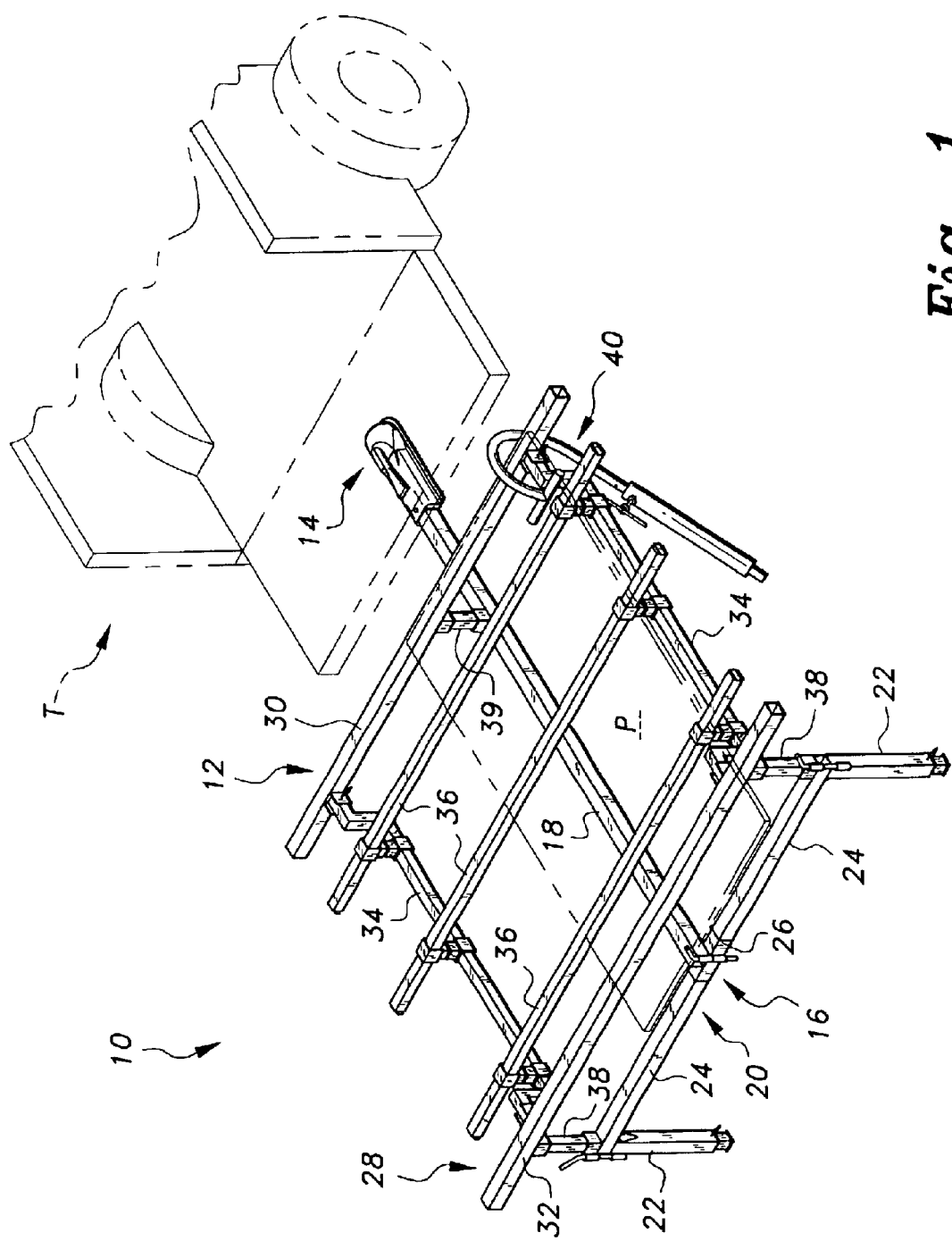

WORKBENCH AND UNLOADING PLATFORM PARTIALLY SUPPORTED BY VEHICLE HITCH

BACKGROUND OF THE INVENTION

1. Field of the Invention

The present invention relates to work benches. More particularly, the present invention relates to adjustable work benches partially supported by a vehicle hitch for unloading and sawing flat material such as plywood.

2. Description of the Related Art

The transport, unloading, and sawing of outsized sheet materials such as plywood sheet requires much effort in handling the sheet of material during these activities, particularly, when only one person is available for the task.

It is known to provide work platforms which are totally or partially supported by a hitch or hitch receiver of a vehicle such as a truck. It is also known to provide a hitch mounted platform for assisting in unloading cargo from a truck. It is further known to provide a workbench having two spaced supports for supporting a workpiece during sawing.

It would be desirable to provide a workbench which enables a single worker to easily unload and support a plywood sheet or other similar material from a truck bed and provide a number of moveable elongated workpiece supports which are themselves supported from below, leaving space between supports and between the workpiece such as a sheet of plywood and any lower support for a saw blade to pass.

U.S. Pat. No. 5,680,976, issued Oct. 28, 1997, to Kollopoulos et al., describes a device supported by a vehicle hitch receiver providing a large flat work area having spaced square tubing and a frame useful in unloading and supporting cargo.

U.S. Pat. No. 4,516,308, issued May 14, 1985, to Urban, describes a hitch mountable workshop structure having various facilities for performing precision machine work.

U.S. Pat. No. 5,267,748, issued Dec. 7, 1993, to Curran, describes vehicle tool platform apparatus useful as a work bench on the tailgate of a truck bed.

U.S. Pat. No. 6,244,127 B1, issued May 1, 2001, to Hodge, describes various configurations of vehicle mounted tool supports and see, in particular, the embodiments of FIGS. 7 and 12 employing the ground supports.

None of the above inventions and patents, taken either singly or in combination, is seen to describe the instant invention as claimed. Thus a workbench supported by a vehicle hitch solving the aforementioned problems is desired.

SUMMARY OF THE INVENTION

The workbench and unloading platform partially supported by a vehicle hitch of the present invention has a lower frame which includes a center bar having a vehicle hitch ball receiver mounted on a front end and is supported by a cross bar at its rear end. The lower frame cross bar has supporting legs on each end which are adjustable in length to match terrain to level the platform for use. The lower frame is foldable for compact storage by employing hinges to connect the various parts and sleeves with removable pins for erection of the lower frame.

An upper frame is supported on the lower frame by risers and removably held in place by respective lower and upper riser receivers. The upper frame includes front and rear cross bars, the front cross bar being supported at its center by a riser extending upward from a forward portion of the lower frame center bar. The rear cross bar is supported by risers extending upward from the supporting legs. The upper frame includes two side bars supported inboard, respectively, from the rear cross bar riser receivers by sidebar end supports and pins, forming a rectangular frame with the front and rear cross bars extending substantially beyond the supports and the rear legs.

The upper frame side bars are offset below the level of the front and rear cross bars and each sidebar preferably has three sleeves slideable along each offset portion of the sidebars. Each sleeve has a receiver on its upper side. Three movable work support cross bars are supported on sliding sleeves near each end and having downward extending cylindrical supports which are rotatably supported in the corresponding receivers on the upper side of each side bar sleeve, allowing the work support cross bars to be moved to desired positions along the side bars. The cylindrical supports may rotate within the side bar sleeves and the support cross bar sleeves may slide along the support cross bars, allowing one or more support cross bars to be set at a desired angle relative to the front and rear cross bars. The upper frame and support cross bars form a level support for a workpiece such as a sheet of plywood and the support cross bars may be adjusted as desired to allow sawing of the plywood as desired. The saw blade of a hand-held rotary or jig saw may be adjusted so as to cut the plywood while clearing the offset side bars.

The lower frame members are connected by hinges and the lower frame can be folded into a compact configuration for storage upon removal of pins from pin sleeves at the joints thereof. The upper frame members, risers, and movable cross bars are supported in place by gravity and may be dissembled by removing pins.

Accordingly, it is a principal object of the invention to provide a combination workbench and unloading platform useful for handling outsized materials such as plywood sheet.

It is another object of the invention to provide a combination workbench and unloading platform as above which is attached to and partially supported by a vehicle hitch such as that of a loaded truck It is a further object of the invention to provide a combination workbench and unloading platform as above having movable workpiece support bars, which allow sawing of the workpiece at a desired location and angle relative to the workbench.

It is yet another object of the invention to provide a combination workbench and unloading platform having an adjustable clamp for holding the workpiece during sawing or other work.

Still another object of the invention is to provide a combination workbench and unloading platform as above which is foldable into a compact package.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is an environmental, perspective view of a workbench and unloading platform partially supported by a vehicle hitch according to the present invention.

Similar reference characters denote corresponding features consistently throughout the attached drawings.

DETAILED DESCRIPTION OF THE PREFERRED EMBODIMENT

The present invention is a combination work bench and unloading platform partially supported by a hitch of a truck such as a pickup truck which enables a single person to readily unload outsized material such a plywood sheet and support it by spaced, movable supports in a desired manner for sawing or otherwise performing work on the sheet. A hold-down clamp is provided for holding the sheet in place during sawing or other work. The combination workbench and unloading platform may be easily disassembled and folded into a compact storage configuration.

Figure 2A:
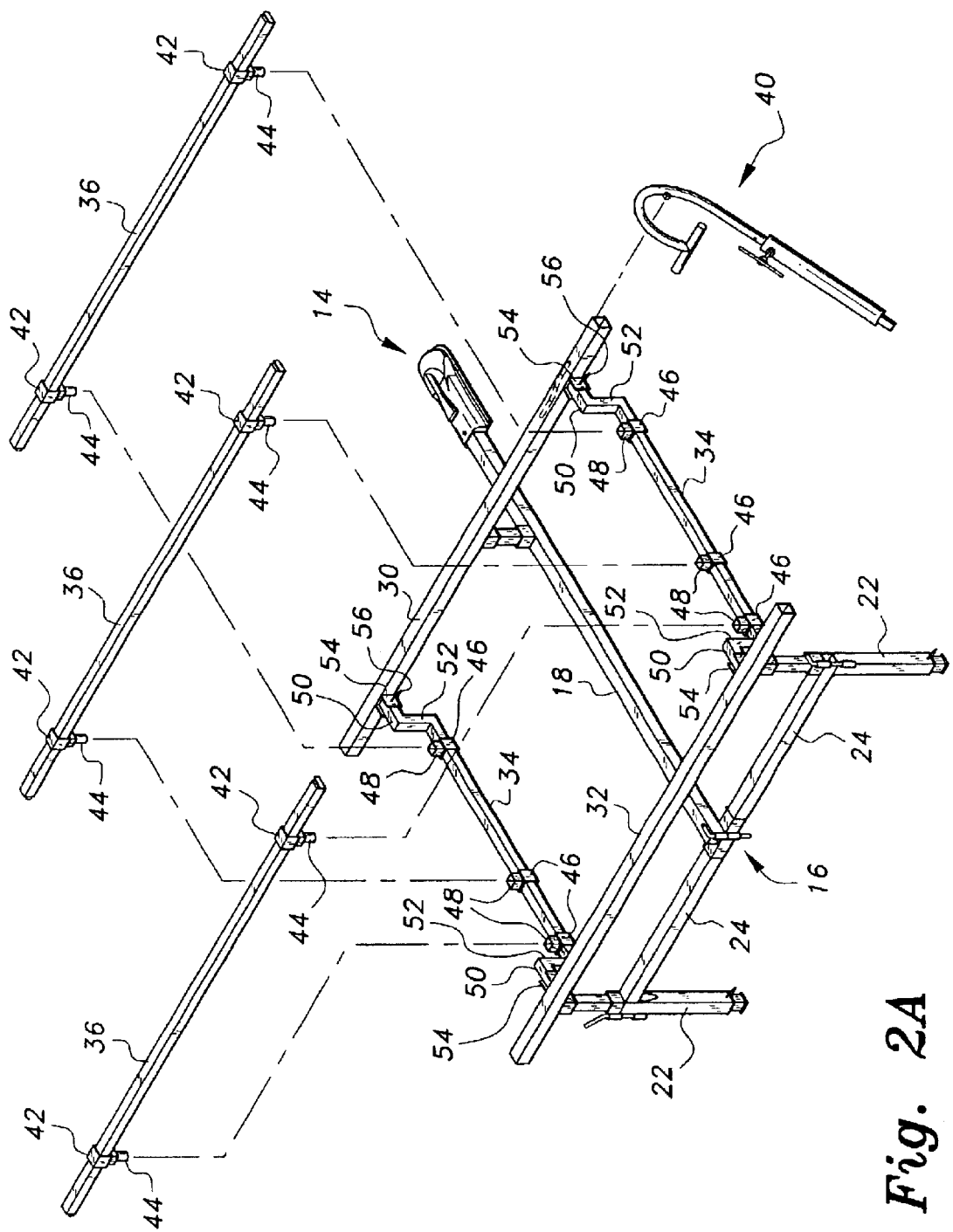
FIG. 2A is a partially exploded view of the workbench of FIG. 1 with movable work support bars and clamp exploded from the workbench assembly.
Figure 2B:
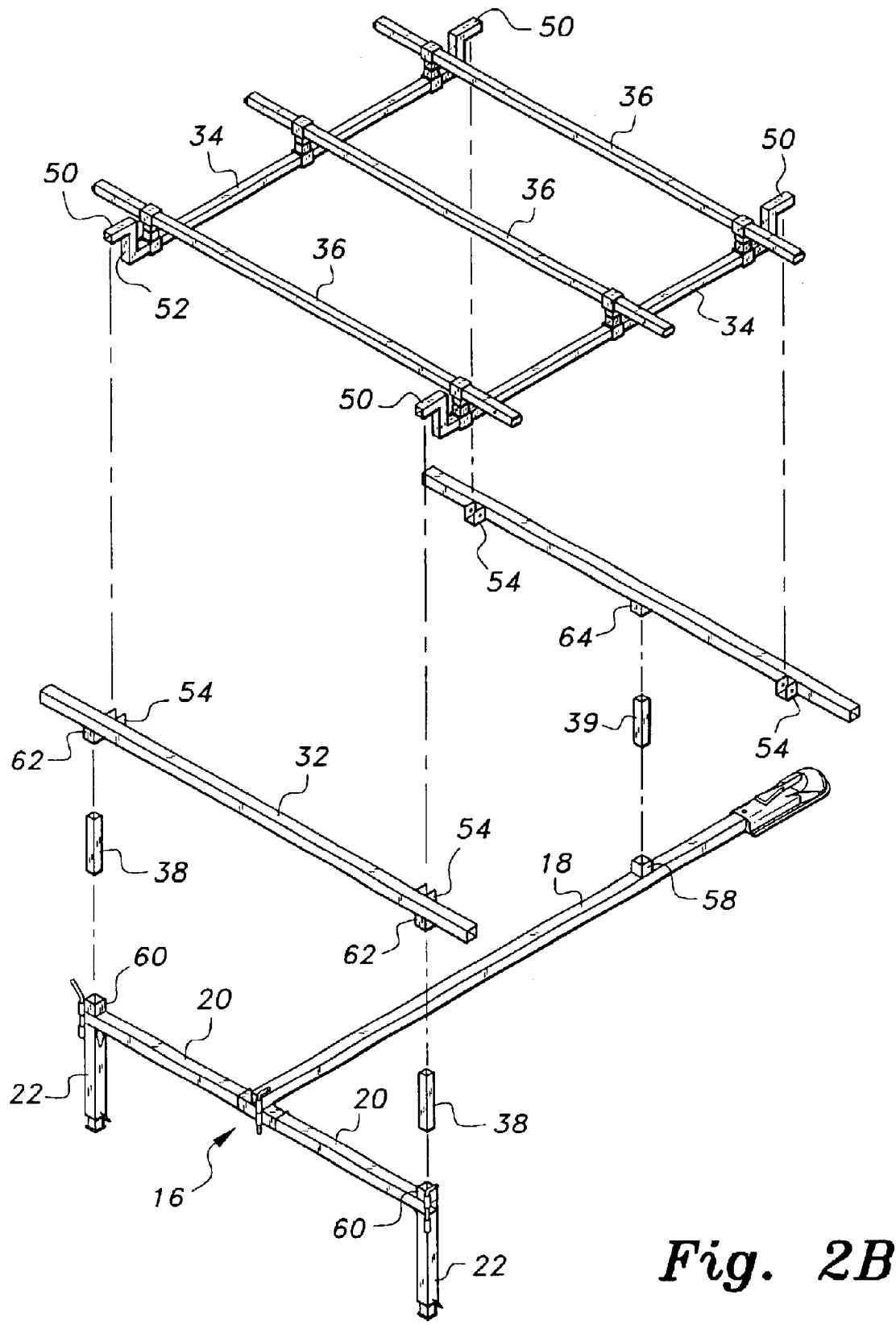
FIG. 2B is a partially exploded view with the upper frame of FIG. 1 exploded from the lower frame.

Referring to FIGS. 1–2B, there is shown an environmental perspective view and exploded views of the inventive combination workbench and unloading platform system generally designated by reference number 10. System 10 includes workbench and unloading platform 12 having a hitch receiver 14 attached to lower frame 16 at the front end portion or neck of center bar 18. Lower frame 16 also includes a cross bar 20 attached at its center perpendicular to the rear portion of center bar 18. Lower frame cross bar 20 includes a center joint bar 26 attached to center bar 18 and spreader bars 24 attached to and extending from each end of center joint bar 26. Rear legs 22 are attached at the outer ends of spreader bars 24 and are adjustable in length (see FIG. 6). Hitch receiver 14 is shown as connected with a pickup truck T having a conventional ball hitch.

Upper work support frame 28 is generally rectangular and has a front cross bar 30, a rear cross bar 32, and offset side bars 34 connecting front cross bar 30 and rear cross bar 32 at points spaced inward from the respective ends of cross bars 30 and 32. Upper work support frame 28 is supported above lower frame 16 by rear vertical risers 38 and front vertical riser 39. Rear vertical risers 38 are located on the outer ends of spreader bars 24 above rear legs 22, respectively, and support rear cross bar 32 at points spaced inward from the respective ends thereof and outward from the connections for offset side bars 34. Front vertical riser 39 is located on the neck of lower frame center bar 18 spaced rearward of hitch receiver 14 so as to provide clearance for the tailgate of truck T when in a lowered position. Gravity swivel clamp 40 is located on work support front bar 30 spaced inward from an outer end thereof for clamping a flat workpiece in place such as plywood panel P during sawing or other work.

Work support moveable cross bars 36 are spaced along offset side bars 34 between front bar 30 and rear bar 32 and supported thereon by support cylinders 44 extending downward from movable positioning sleeves 42 which are slidingly mounted on the moveable cross bars. Side bar sleeves 46 are slidingly mounted along the offset portions of side bars 34, each having a support cylinder receiver mounted thereon so as to receive support cylinders 44 supporting moveable cross bars 36.

Sidebars 34 have offset ends 50 which are connected with sidebar vertical offsets 52 so as to offset sidebars 34 downward from front cross bar 30 and rear cross bar 32 and are supported thereby on each end by sidebar end supports 54 and locked therein by side bar locking pins 56 extending through matching bores 57(see FIG. 7) in the sidewalls of supports 54 and offset ends 50, respectively.

Front vertical riser 59 is supported in front riser receiver 58 located on lower frame center bar 18. Rear vertical risers 58 are supported in rear riser receivers 60 located on the respective outer ends of spreader bars 24 above legs 22. Work support rear cross bar upright receivers 62 are located on the underside of rear cross bar 32 so as to receive rear risers 38. Work support front cross bar receiver 64 is located on the underside of front cross bar 30 at the center thereof and receives front riser 39, thereby supporting upper work support frame 28. Front riser 39 is shorter in length than rear risers 38 by the thickness of lower frame center bar 18.

Figure 3:
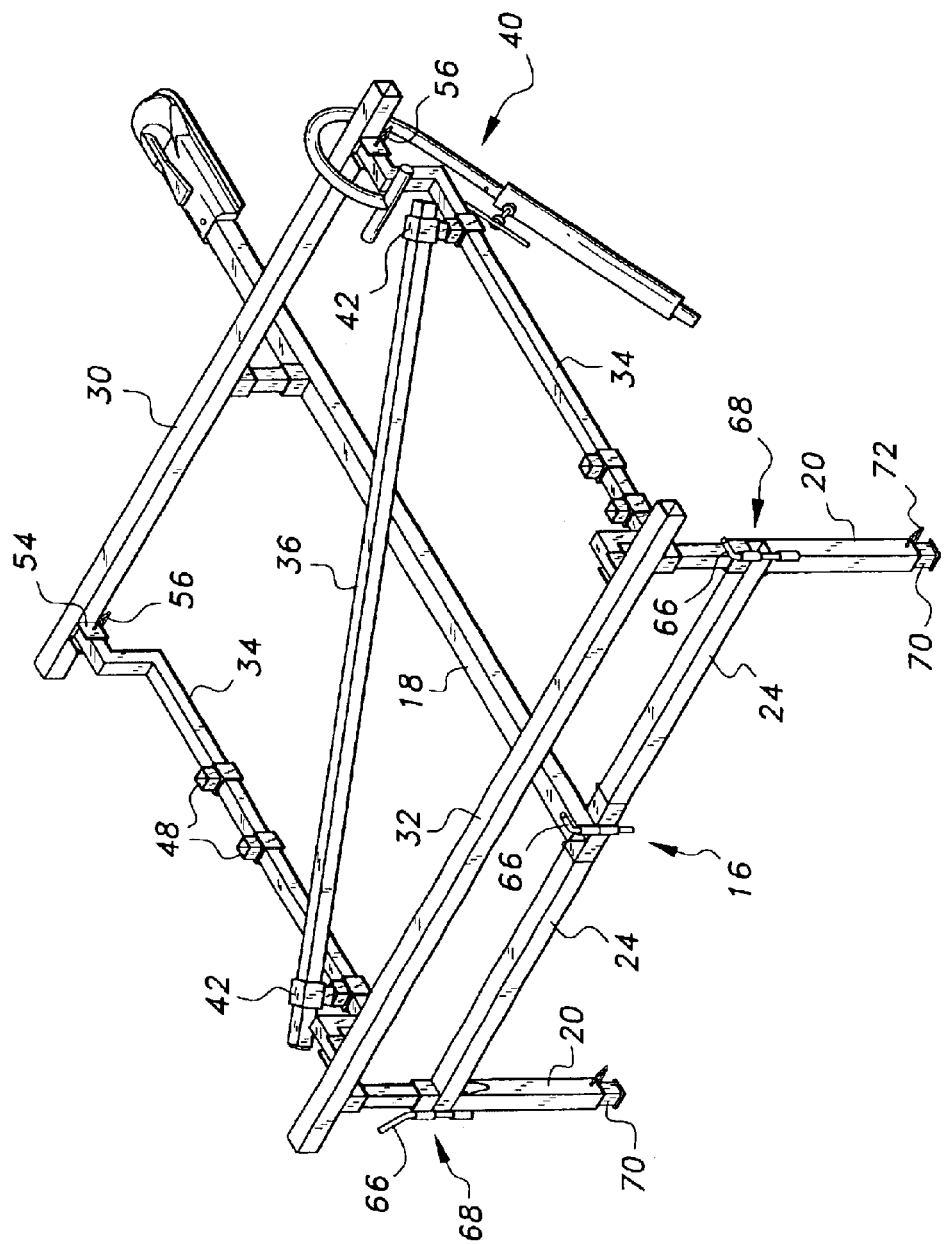
FIG. 3 is a perspective view of the workbench of FIG. 1 having one movable work support bar set at an angle.

As further illustrated in FIG. 3, movable cross bars 36 are movable relative to side bars 34 by sliding support cylinder receivers along side bars 34 to desired locations. The movable cross bar positioning sleeves 42 may be adjusted along a movable cross bar 36, and the support cylinders 44 placed in any two opposing receivers 48 thereby positioning movable cross bars 36 at a desired angle relative to the upper support frame 28. The support cylinders 44 are free to rotate within and be removed from one receiver 48 and placed in another. Movable cross bars 36 may be removed and set aside if not needed for a particular application. The overall vertical height of the positioning sleeves and their upper and lower receivers is such that the upper surfaces of movable cross bars 36 are even with those of front cross bar 30 and rear bar 32, thereby providing a level, flexible support system for a workpiece such as a sheet of plywood, allowing sawing of the workpiece as desired. The blade of a portable circular or jig saw may be set so as cut the workpiece without reaching the downward offset side bars 34.

Although the upper and lower frame and risers may be welded or otherwise permanently connected, it is desirable to configure the combined workbench and unloading platform 12 so as to make it easily disassembled and folded into a relatively linear, compact set of parts. To this end as shown in FIGS. 2A and 2B, movable cross bars 36 may be lifted off side bars 34, front and rear cross bars 30 and 32 may be lifted from risers 39 and 38 and those risers lifted from respective receivers 58 and 60. The upper frame may be dissembled by removing pins 57 (see FIG. 7) and removing the side bars 34 from their end supports 54 on cross bars 30 and 32.

Figure 4:
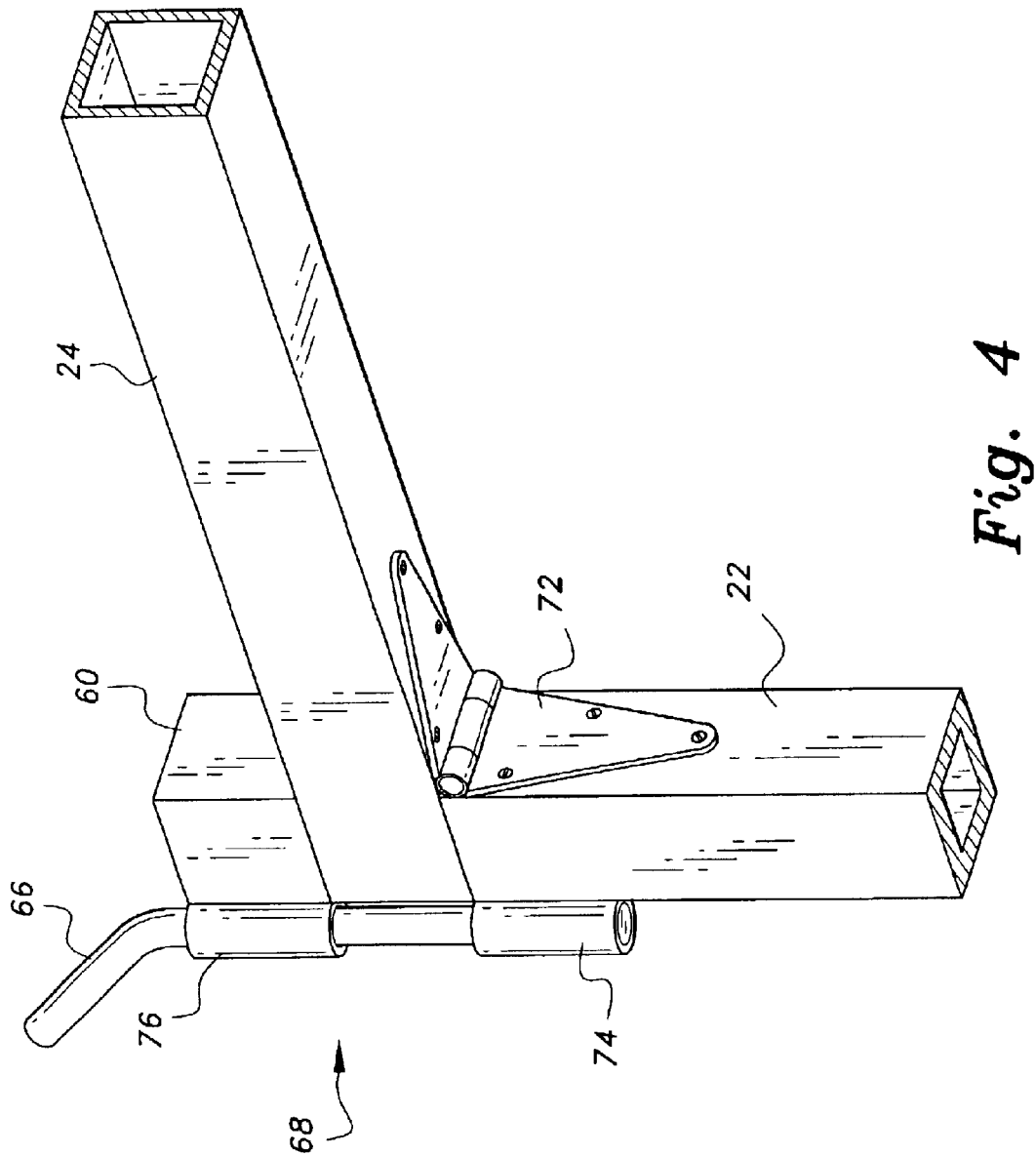
FIG. 4 is a detail view of a foldable rear leg attachment of FIG. 1.

The lower frame 16 is made foldable by connecting the elements of the lower frame 16 with hinges, the lower frame being erected by unfolding and inserting pins 66 into pin receivers on adjoining elements. More particularly, as seen in FIG. 4, hinge 72 is attached to the inner side of leg 22 and the underside of spreader bar 24 to allow leg 22 to fold inward under spreader bar 24. When erected, lower pin sleeve 74, attached to leg 22 and upper pin sleeve 76 attached to riser receiver 60 are vertically aligned and pin 66 inserted therethrough to form foldable joint 68.

Figure 5A:
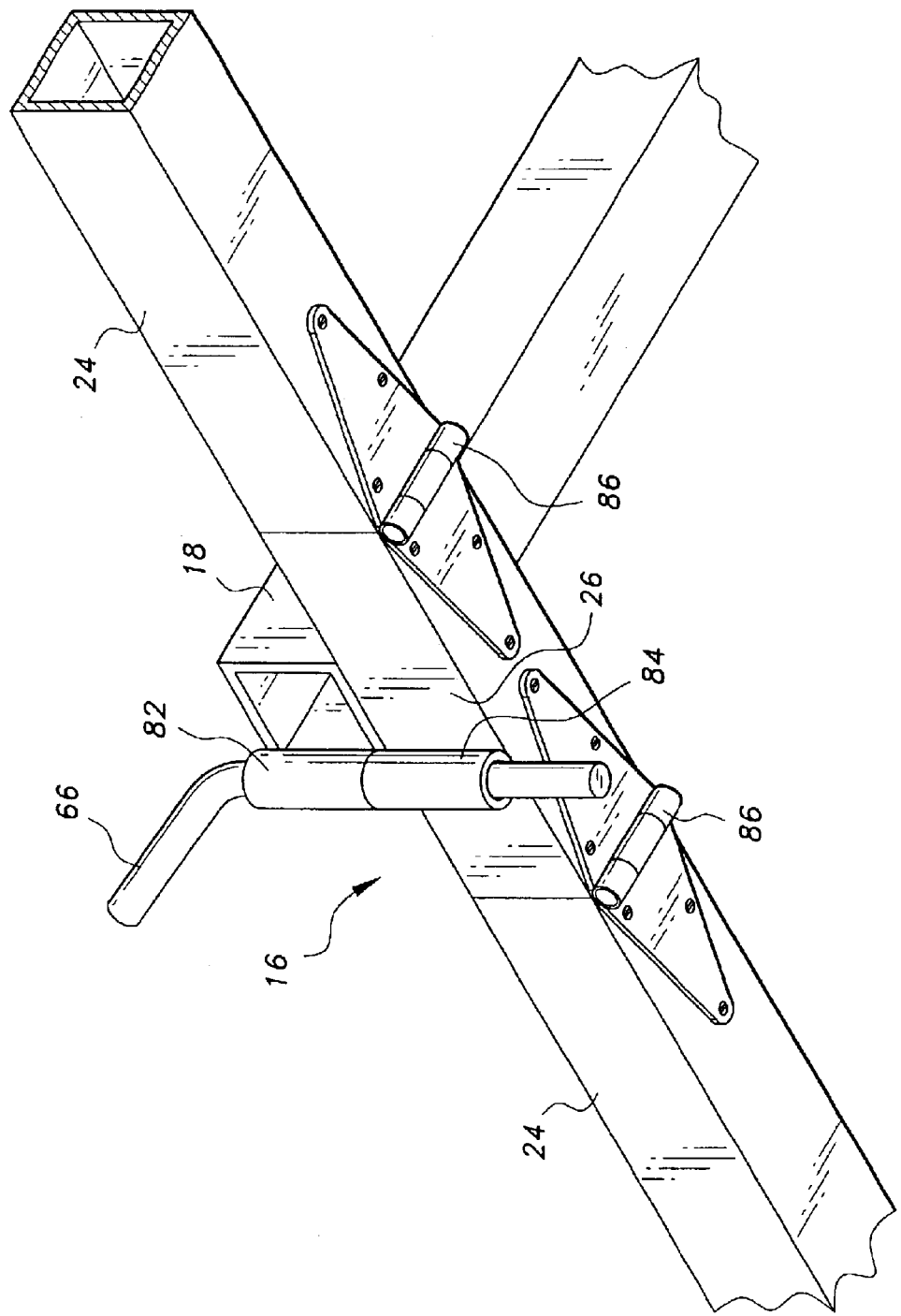
FIG. 5A is a detail lower rear view of the foldable center bar to cross bar attachment of FIG. 1.
Figure 5B:
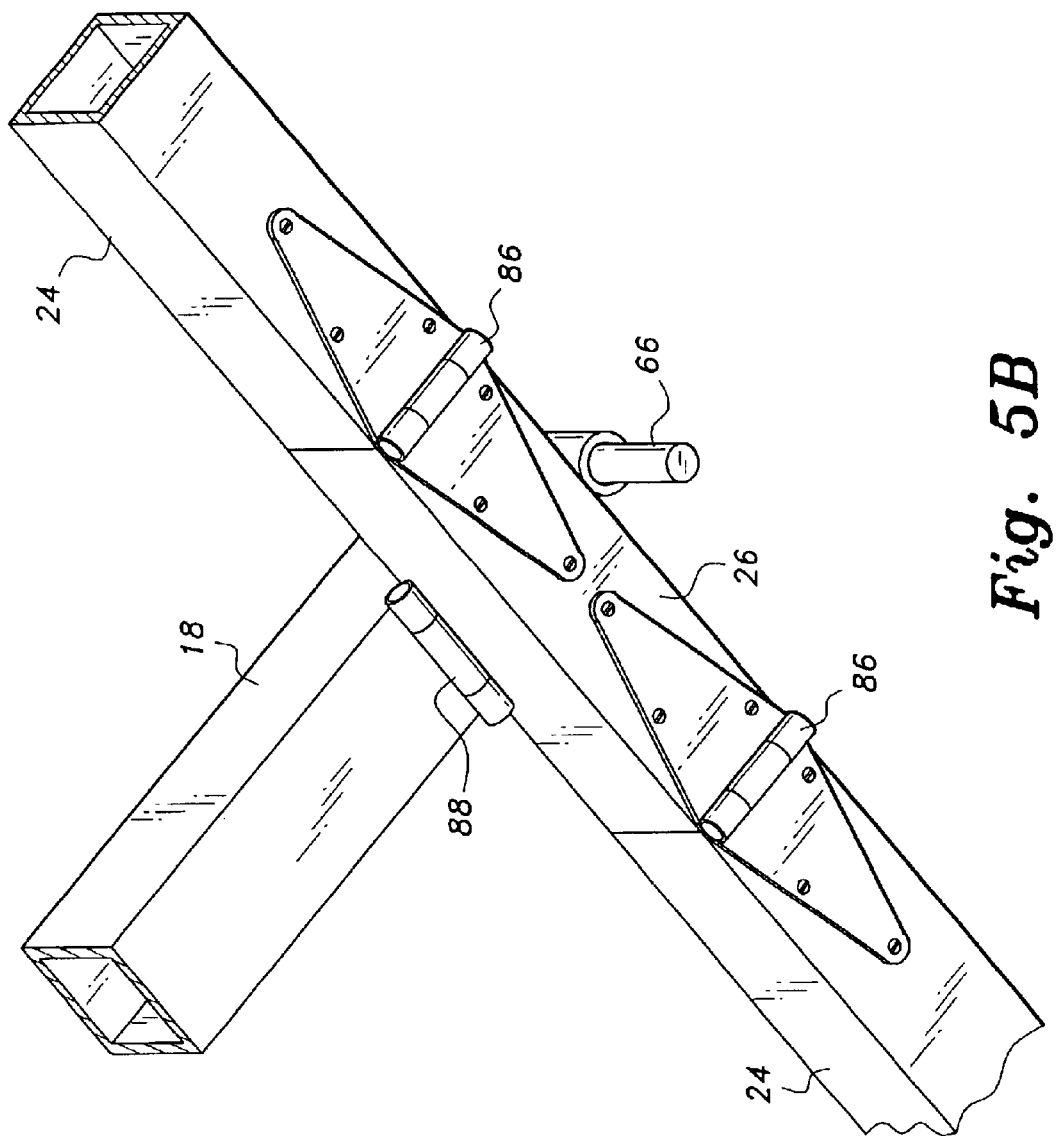
FIG. 5B is a detail lower front view of the foldable center bar to cross bar attachment of FIG. 1.

As seen better seen in FIGS. 5A and 5B, spreader bars 24 are connected at their inner ends to center joint bar 26 by center joint spreader hinges 86 at their respective undersides such that these elements abut each other forming lower frame cross bar 20 which may be easily folded by lifting center joint bar 26 relative to spreader bars 24. As shown in FIG. 5B, the lower side of center bar 18 is connected with the upper side of center joint bar 26 by center joint center bar hinge 88(partially shown) such that the front side of center joint bar 26 may be folded against the underside of center bar 18. By folding the components of the lower frame as described, the center bar, spreader bars, and legs are arranged parallel in a compact configuration. When lower frame 16 is in the erect position center joint upper pin sleeve 82 attached to the end of center bar 18 and center joint lower pin sleeve 84 attached to the center rear portion of center joint bar 26 are vertically aligned and pin 66 inserted therethrough.

Figure 6:
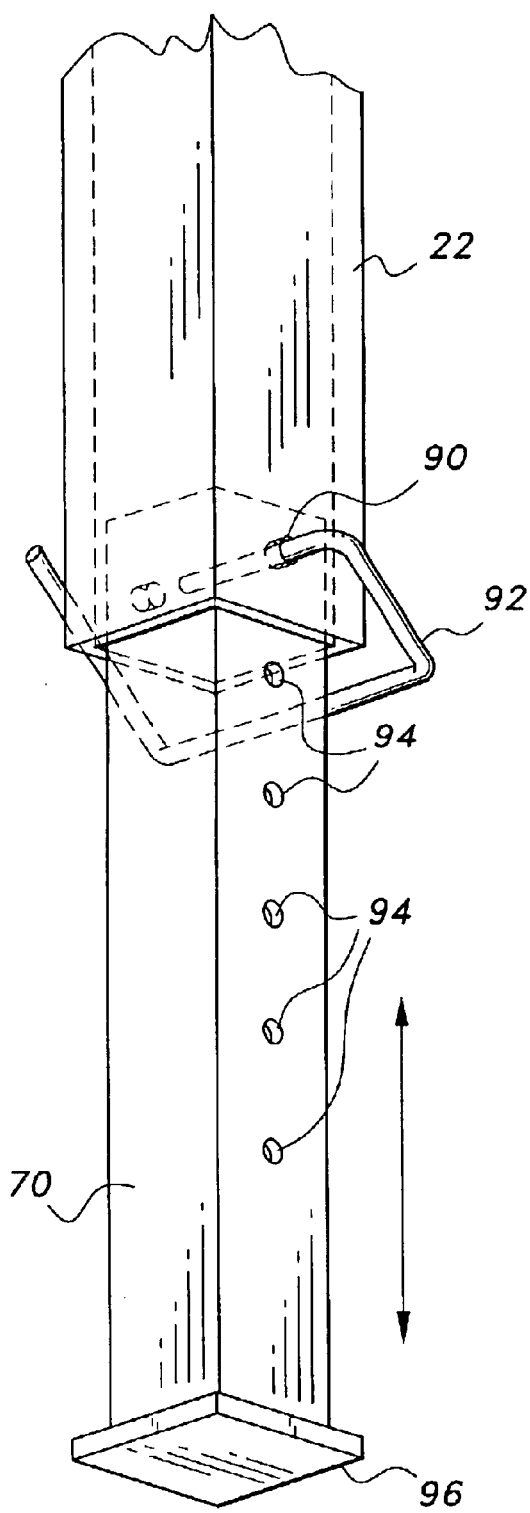
FIG. 6 is a detail view of a height adjustable rear leg of FIG. 1.

Referring to FIG. 6, the rear legs 22 may be individually adjusted in height to maintain the workbench level on uneven ground. Rear legs 22 slidably receive leg extensions 70 at their lower end. Leg extensions 70 have a series of leg extension bores 94 extending vertically therealong and rest on a pads 96. Overall leg length may be adjusted by aligning a desired bore 94 with leg adjustment pin bore 90 and inserting pin 92 therein. It is noted that the ball hitch 14(see FIG. 1) allows rotation relative to the truck T, also assisting in the leveling of the workbench.

Figure 7:
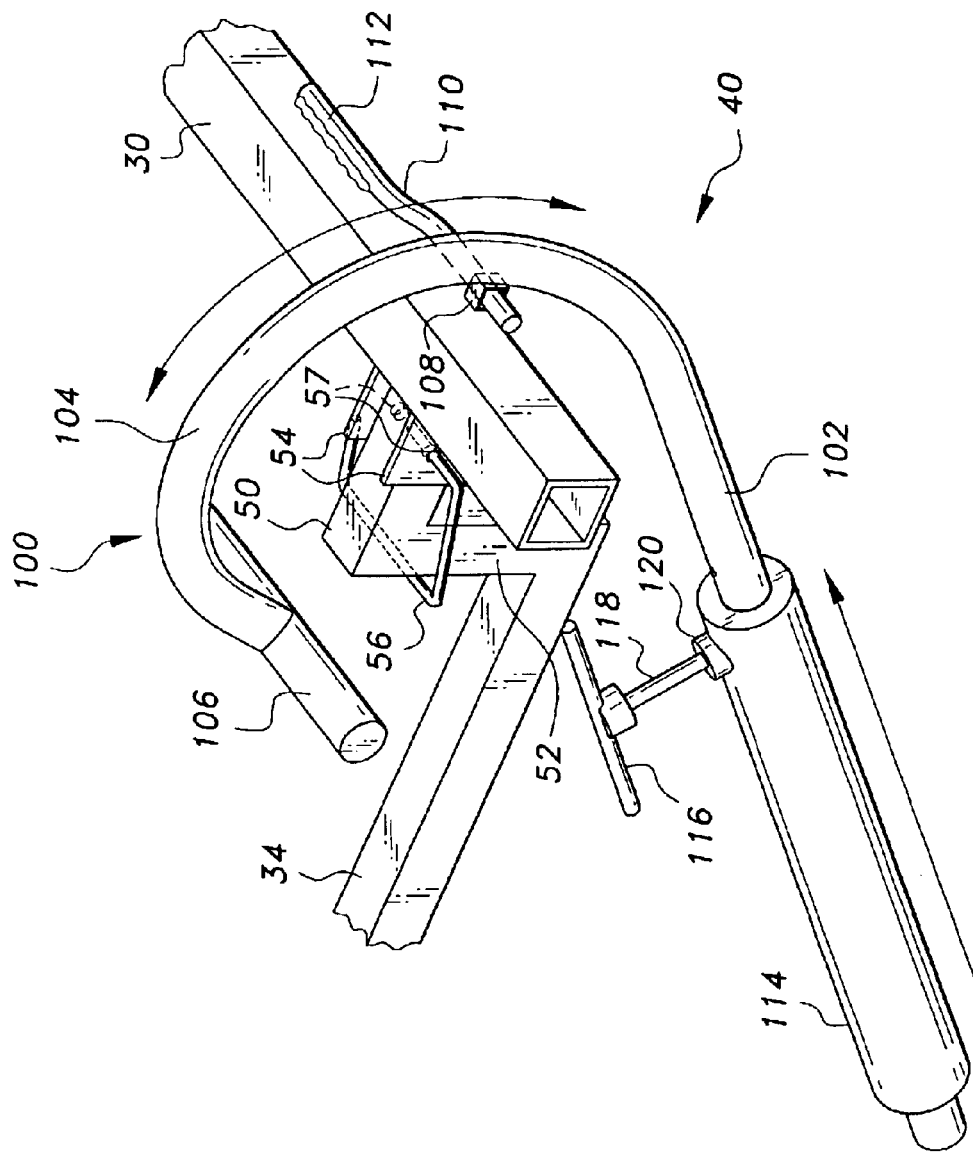
FIG. 7 is a detail view of the workpiece clamp of FIG. 1.

Referring to FIG. 7, a detail view of the attachment of side bars 34 with front cross bar 30 of the upper frame 30 and the configuration and mounting of gravity swivel clamp 40 are shown. Sidebar offset end 50 is offset from the offset portion of side bar 34 by vertical offset 52. Offset end 50 is snugly positioned in a receiver 54 extending inward from the inner wall of front cross bar 30. The offset end 50 is removably locked in place by pin 56 placed through pin bores 57.

Gravity swivel clamp 40 has a clamp bar 100 consisting of a lower straight portion 102, a curved portion 104, and ending with a clamping bar 106 attached perpendicular to curved portion 102. A rotation sleeve 108 is mounted on the lower portion of curved portion 104 on the inner side thereof. An offset axle 110 is attached along the lower front edge of front cross bar 30 by weld 112 so as to form an offset portion spaced from the wall of cross bar 30, the clamp bar 100 being free to rotate on the offset portion at rotation sleeve 108 and is easily mounted and dismounted therefrom. A cylindrical weight 114 is located on lower straight portion 102 of clamp bar 100 and may be positioned at a desired location therealong by rotating set bar 118 within threaded mount 120 by means of handle 116(threads not shown). The set bar is tightened against clamp bar 100 at a desired point along straight portion 102 which is positioned at an angle to vertical when in use. This causes rotational force due to gravity to be applied to clamp bar 100, which, in turn, applies downward force to clamping bar 106 and thus to a workpiece P (see FIG. 1). The clamping force may be reduced by setting the weight 114 further up the straight portion 102 and increased by setting the weight 114 further down the straight portion 102 of clamp bar 100.

Figure 8:
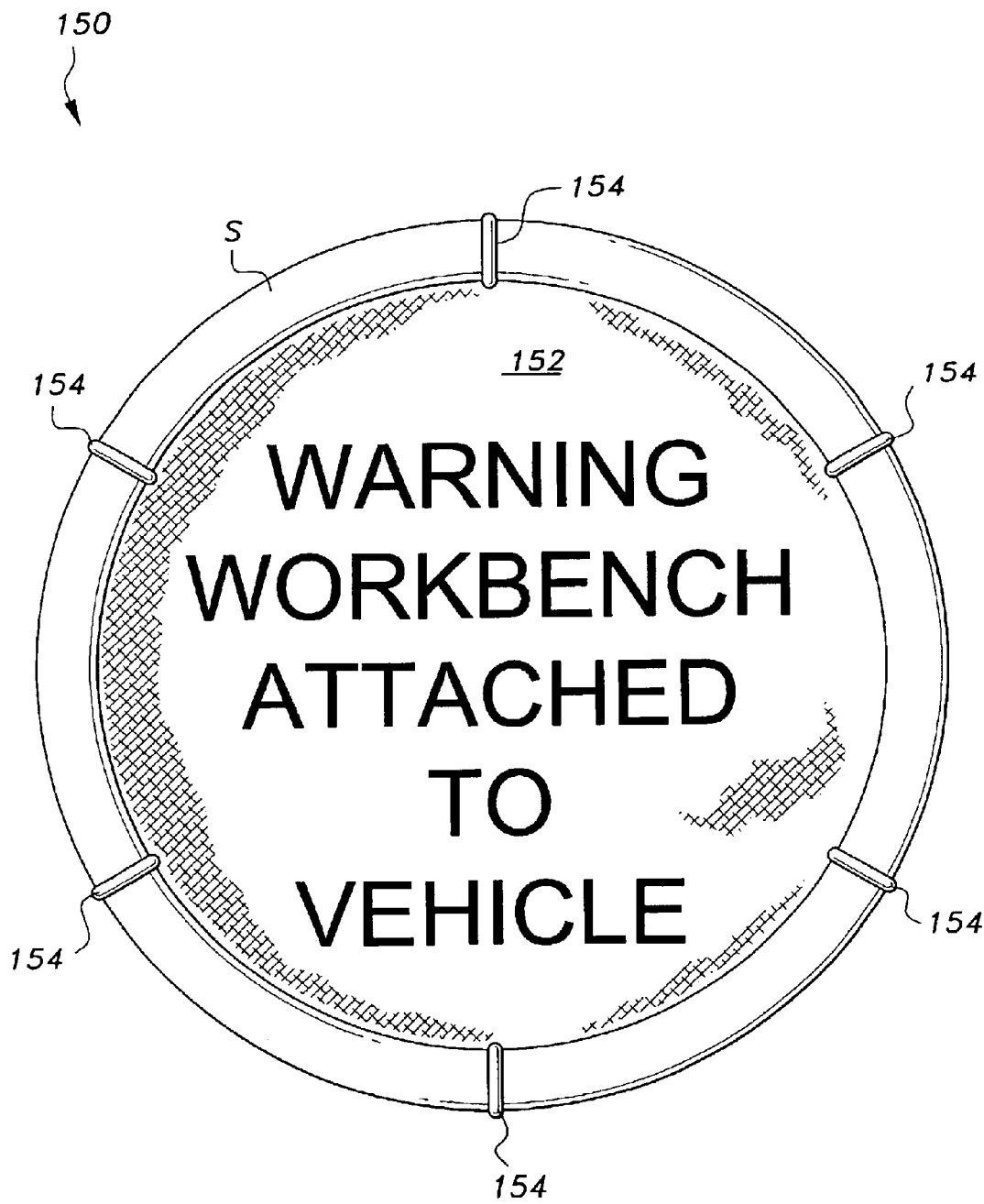
FIG. 8 is an elevation view of a steering wheel mounted warning sign useful with the combination workbench and unloading platform of FIG. 1.

Referring to FIG. 8, there is shown a warning system 150 for use when the inventive combination workbench and unloading platform is connected to the hitch of truck T. The warning system is a circular cloth or plastic warning sign 152 attached to the steering wheel S by hooks 154. The warning system assures that the truck is not moved while hitched to the inventive workbench and is easily removed when free of the workbench.

The frames, cross bars, risers, legs and receivers of the inventive combination workbench and unloading platform are preferably constructed of square metal tubing such as aluminum or steel. The preferred dimensions of the upper frame are about 4 feet in length and about six feet in width so as to support a conventional sheet of plywood in a crosswise manner. In use, the operator may set the movable crossbars of the workbench as desired. He then slides a sheet of plywood from the bed of truck T onto the tailgate and then onto the combination workbench and unloading platform while turning the sheet of plywood. The swivel clamp 40 may be removed to facilitate unloading and replaced when the plywood is in place and ready to clamp for sawing or other work.

It is to be understood that the present invention is not limited to the embodiment described above, but encompasses any and all embodiments within the scope of the following claims.

I claim:

1. A combination workbench and unloading platform system comprising:

a lower frame comprising a center bar having a forward end portion and a rear end portion and a perpendicular cross bar having remote ends and a central joint connected with said center bar at said rear portion;

means for supporting said lower frame at said center bar forward end portion and at said cross bar opposing ends; and an upper frame having a front cross bar, a rear cross bar, and spaced side bars;

said upper frame being supported by risers extending vertically between said lower frame and said front cross bar and said rear cross bar;

said frame having at least one moveable cross bar spaced between said front cross bar and said rear cross bar and slidingly supported by said spaced side bars;

whereby an outsized work piece such as a plywood sheet may be supported by said front cross bar, said rear cross bar, and said at least one movable cross bar, and whereby said movable cross bar may be adjusted forward or back and at a desired angle to support a work piece while sawing or otherwise working on a work piece.

2. The combination work bench and unloading platform of claim 1, wherein said upper frame is rectangular in shape, said side bars being removably attached at their respective ends by supports located on said front cross bar and said rear cross bar and spaced on opposite sides relative to said lower frame center bar.

3. The combination work bench and unloading platform of claim 2, wherein said side bars each have an offset portion vertically offset below the level of said front and rear crossbars, and said at least one moveable cross bar having a pair of spaced positioning sleeves thereon, said moveable cross bar being supported on each said offset portion by said positioning sleeves having support cylinders extending downward therefrom such that said moveable cross is even in elevation with said front and rear crossbars so as to provide level support for a workpiece.

4. The combination work bench and unloading platform of claim 3, wherein said offset portions have sleeves having support cylinder receivers on the their upper sides.

5. The combination work bench and unloading platform of claim 4, wherein said sleeves are slidably mounted on their respective moveable cross bar and side bar offset portions and said support cylinder receivers support said support cylinders for rotation therein.

6. The combination work bench and unloading platform of claim 5, wherein there are a plurality of movable cross bars supported by said side bar offset portions and each said movable cross bar is substantially longer in width than the spacing of said side bars.

7. The combination work bench and unloading platform of claim 6, wherein said lower frame center bar and said upper frame front cross bar have corresponding riser receivers and said remote ends of said lower frame cross bar and said upper frame rear cross bar have corresponding riser receivers, whereby said upper frame may be supported on said lower frame by placing the lower ends of the risers in the respective lower frame riser receivers and the corresponding upper frame riser receivers placed over the upper ends of the risers, thereby supporting the upper frame relative to the lower frame.

8. The combination work bench and unloading platform of claim 7, said lower frame crass bar having a center joint bar and a spreader bar extending outward from each end of said center joint bar, said center bar rear portion end being attached to said center joint bar at said center joint, said means for supporting said lower frame comprising legs extending downward from said respective spreader bars at the remote ends thereof.

9. The combination work bench and unloading platform of claim 8, wherein said lower frame legs are foldably mounted on said respective spreader bars by hinges so as to fold under and coextend with said respective spreader bars, said lower frame legs being lockable in an upright position by vertically aligned leg joint lower pin sleeves mounted on said legs and upper pin sleeves mounted on said spreader bars and removable pins extending vertically through said respective upper pin sleeves and said lower pin sleeves, whereby, upon removal of said pin sleeves, the legs may be folded under the spreader bars.

10. The combination work bench and unloading platform of claim 9, wherein said center joint of said lower frame center bar and said center joint bar are hinge mounted so as to allow said center joint bar to fold forward under said lower frame center bar, and said spreader bars are binge mounted to said center joint bar by binges mounted on their respective underneath sides, said center joint bar being lockable in an unfolded position relative to said lower frame center bar by vertically aligned pin sleeves mounted on said center joint bar and said lower frame center bar and a removable pin extending vertically through said respective aligned pin sleeves, whereby upon removing the pin from the pin sleeves, the center joint bar may be folded rotated under the center bar and the spreader bars may be rotated forward so as to align with the center bar for compact storage.

11. The combination workbench and unloading platform of claim 8, wherein said legs are adjustable in length.

12. The combination workbench and unloading platform of claim 11, wherein said lower frame center bar, said lower frame cross bar, said receptacles, said sleeves, said risers, said upper frame cross bars, and said movable cross bars are square tubing.

13. The combination workbench and unloading platform of claim 8, further comprising an offset clamp axle affixed to said upper frame front cross bar near an outer end thereof and a gravity swivel clamp removably mounted for rotation on said clamp axle for clamping a workpiece in place for sawing.

14. The combination workbench and unloading platform of claim 7, further comprising a hitch receptacle mounted to said front end of said lower frame center bar such that center bar of said lower frame can be supported by a hitch mounted on a vehicle.

15. The combination workbench and unloading platform of claim 14, wherein the space along said lower frame center bar between said hitch receptacle and said center bar riser is at least equal to the length of a pickup truck tailgate when in a lowered position.

16. The combination workbench and unloading platform of claim 15, wherein said risers are of such length that said upper frame is equal in elevation to the length of a pickup truck tailgate.

17. The combination workbench and unloading platform system of claim 14, further comprising a sign warning of the attachment of the combination workbench and unloading platform to a vehicle hitch comprising a sign portion of such size and configuration as to fit within the rim of a steering wheel having hooks attached to and spaced around the periphery of said sign and adapted to removably fit over a steering wheel rim, whereby the operator may easily attach said sign to a steering wheel before hitching the workbench to a vehicle and remove said sign from the steering wheel after unhitching the workbench, thereby helping prevent the operation of a vehicle while hitched to the combination workbench and unloading platform.

18. A combination workbench and unloading platform;

a horizontally disposed lower frame comprising a center bar having a forward neck portion having a hitch receiver mounted on the front end thereof and a rear end portion, and a rear cross bar having remote ends and centrally mounted perpendicular to said center bar at said rear end portion;

a horizontally disposed, generally rectangular upper frame having a front cross bar, a rear cross bar, and spaced side bars;

a front vertical riser extending between said lower frame center bar neck portion and a center point of said upper frame front cross bar;

a pair of rear vertical risers extending between said remote ends of said lower frame rear cross bar and said upper frame rear crossbar, respectively;

said lower frame having riser receivers on the upper surface thereof and located for receiving said vertical risers;

said upper frame having riser receivers on the lower surface thereof and located for receiving said vertical risers supporting said upper frame;

said lower frame having adjustable length legs extending downward from the lower surface of said remote ends of said lower frame rear crossbar;

each said upper frame sidebar having a downward offset portion extending the substantial length thereof and having vertical offsets and horizontal ends, said upper frame front crossbar and rear cross bar having sidebar end supports for receiving the respective horizontal ends of said upper frame sidebars;

each said upper frame sidebar offset portions having a corresponding plurality of sleeves slidably mounted thereon, said sleeves each having a support cylinder receiver on the upper side thereof; and a plurality of movable cross bars, each having a pair of sleeves slidably mounted thereon, said sleeves each having a support cylinder depending downward therefrom, said support cylinders being of such dimensions as to be inserted into corresponding support cylinder sleeves and supported for rotation by corresponding said sleeves mounted on said sidebar offset portions;

said support cylinder sleeves being of such length as to support said movable cross bars at an elevation even with said front and rear upper frame cross bars;

said movable cross bars being of such length as to extend substantially beyond said sleeves thereon when supported by said sidebars;

whereby said lower frame is supported by said adjustable length legs and a vehicle hitch; and whereby said movable cross bars may be moved forward or back and at an angle to said sidebars and may be individually removed from the sidebars so as to configure the workbench to horizontally support a relatively flat workpiece for sawing the workpiece, such as a sheet of plywood, at desired angles and locations without interference from the structural members of the workbench.

19. The combination workbench and unloading platform of claim 18, further comprising at least one gravity swivel clamp attached for rotation to at least one of said upper frame front crossbar and said upper frame rear cross bar for clamping a workpiece in place for sawing or other work.

20. The combination workbench and unloading platform of claim 18, wherein said neck of said lower frame center bar extending between said hitch receiver and said front riser receiver is of sufficient length that said front riser and upper frame front cross bar clear a pickup truck tailgate when in an open horizontal position.

* * * * *